United States Patent [19]
Miyazaki et al.

[11] Patent Number: 5,317,382
[45] Date of Patent: May 31, 1994

[54] OPTICAL PHASE DETECTION METHOD WITH ORTHOGONAL POLARIZATION AND PHASE COMPENSATION ARRANGEMENT

[75] Inventors: Tetsuya Miyazaki, Fujimi; Shiro Ryu, Niiza, both of Japan

[73] Assignee: Kokusai Denshi Denwa Company, Ltd., Tokyo, Japan

[21] Appl. No.: 797,742

[22] Filed: Nov. 25, 1991

[30] Foreign Application Priority Data

Nov. 29, 1990 [JP] Japan .................................. 2-325545

[51] Int. Cl.$^5$ .............................................. G01B 9/02
[52] U.S. Cl. .................................... 356/351; 359/183; 359/187; 359/190; 359/195
[58] Field of Search ............... 356/351, 345; 359/183, 359/187, 189, 190, 191, 195; 340/870.25

[56] References Cited

U.S. PATENT DOCUMENTS 3,658,422  4/1972  Wilkinson ........................... 356/321

OTHER PUBLICATIONS

Japanese Patent Application No. 2-47313.

*Primary Examiner*—Samuel A. Turner
*Assistant Examiner*—LaCharles Keesee
*Attorney, Agent, or Firm*—Jordan and Hamburg

[57] ABSTRACT

A method of optical phase detection, in which a signal light polarized linearly and a local light emitted from a local light laser light source are combined with each other so that an in-phase component and a quadrature component, which is 90 degrees behind the local light in phase and is combined with the signal light, are taken out; and the in-phase component is demodulated while the phase of the signal light and that of the local light are synchronized with each other through the use of the in-phase component and the quadrature component, in which the signal light and the local light are separated into mutually-perpendicular P-polarized and S-polarized components by first and second polarization beam splitters; the phases of the P-polarized or S-polarized components are regulated by first and second optical phase compensation plates so that the polarized components of the signal light are kept in phase with each other, but the polarized components of the local light have a phase difference of 90 degrees between themselves; and the polarized components of the signal light and those of the local light are combined with each other by a first and a second combiner so that the in-phase component and the quadrature component are obtained. Therefore, a method having a low demodulation error can be easily provided to be widely used for high-capacity coherent optical communication.

11 Claims, 4 Drawing Sheets

OPTICAL PHASE DETECTION METHOD WITH ORTHOGONAL POLARIZATION AND PHASE COMPENSATION ARRANGEMENT

BACKGROUND OF THE INVENTION

The present invention relates to an optical phase detection method, more particularly to a method of performing optical phase detection through the use of a quadrature component and an in-phase component.

In optical phase shift keying homodyne transmission, it is necessary to perform control to synchronize the phase $\theta l$ of a local light with the phase $\theta s$ of a signal light in order to demodulate the phase-modulated signal light. The control can be performed by using a Costas-type optical phase locked loop having an optical 90-degree hybrid unit, as mentioned by A. Schopflin et al. in Electron. Lett. 26,395, 1990.

For the description of an optical phase detection method disclosed in the Japanese Patent Application No. 2-47313 (having a filing date of Mar. 1, 1990, and a publication date of Nov. 11, 1991) made by the two present inventors plus a third inventor, FIG. 4 shows the constitution of a Costas-type optical phase locked loop having a conventional optical 90-degree hybrid unit 1, and FIG. 5 shows the constitution of the unit. The signs ○, ↑, ∕ and ◯ in FIGS. 4 and 5 denote an S-polarized light component, a P-polarized light component, linear polarization of light, the plane of vibration of which has an angle of 45 degrees to the optical axis of a polarization beam splitter, and circular polarization of light, respectively. The arrows shown by dotted in FIGS. 4 and 5 denote the direction propagation of light. A signal light S1 linearly polarized to have a plane of vibration at an angle of 45 degrees to the optical axis of a polarization beam splitter 1a is entered into it. The splitter 1a splits the signal light S1 into signal lights S2 and S3. A local light L0 emitted from a local light laser light source 2 and linearly polarized is changed into a circularly polarized light L1 by a quarter-wavelength plate 1e. The circularly polarized light L1 is entered into another polarization beam splitter 1c which splits the light into local lights L2 and L3. The P-polarized component S3 of the signal light S1 and the P-polarized component L3 of the local light L1 are combined with each other by a half mirror 1b which is an optical combiner. The S-polarized component S2 of the signal light S1 and the S-polarized component L2 of the local light L1 are combined with each other by another half mirror 1d which is another optical combiner. Lights S4 and L5 and lights S5 and L4, which are obtained through the combining by the half mirror 1b, are received by a balanced receiver 3 so that an output Vb1 is obtained therefrom. Lights S6 and L7 and lights S7 and L6, which are obtained through the combining by the other half mirror 1d, are received by another balanced receiver 4 so that an output light Vb2 is obtained therefrom. As for the hybrid unit 1 shown in FIG. 5, the output light Vb1 is a quadrature component, and the other output light Vb2 is an in-phase component. If the circular polarization of the local light L1 is clockwise with regard to being seen from the quarter-wavelength plate 1e, the phase of the P-polarized component L3 is 90 degrees behind that of the S-polarized component L2 so that the output light Vb1 is the quadrature component proportional to sin $(\theta s - \theta l)$, and the other output light Vb2 is the in-phase component proportional to cos$(\theta s - \theta l)$ wherein $\theta s$ and $\theta l$ denote the phases of the signal light and the local light, respectively. If the circular polarization of the local light L1 is counterclockwise with regard to being seen from the quarter-wavelength plate 1e, the phase of the P-polarized component L3 is 90 degrees ahead of that of the S-polarized component L2 so that the output light Vb1 is the in-phase component proportional to cos$(\theta s - \theta l)$, and the other output light Vb2 is the quadrature component proportional to sin $(\theta s - \theta l)$.

The optical 90-degree hybrid unit 1 operates so that the polarization of the signal light S1 and that of the local light L1 are made the same as each other by the polarization beam splitters 1a and 1c, and the polarized components of the signal light and the local light are thereafter combined with each other by the half mirrors 1b and 1d, as described above. For that reason, the difference between the phases of the local lights L2 and L3 can be prevented from being affected by the polarization characteristics of the half mirrors 1b and 1d, and are therefore stably kept at 90 degrees.

The signal light S4 and the local light L5, which are outputs from the half mirror 1b, are herein referred to as Q+ component signals. The signal light S5 and the local light L4, which are the other outputs from the half mirror 1b, are herein referred to as Q− component signals different by a phase angle of 180 degrees from the Q+ component signals. The signal light S6 and the local light L7, which are outputs from the other half mirror 1d, are herein referred to as I+ component signals. The signal light S7 and the local light L6, which are the other outputs from the latter half mirror 1d, are herein referred to as I− component signals different by a phase angle of 180 degrees from the I+ component signals.

Since the phase locked loop shown in FIG. 4 employs the balanced receivers 3 and 4 which differentially combine the likewise polarized signals with each other, the half mirrors 1b and 1d which are the output members of the hybrid unit 1 operate as π-hybrid units.

The outputs Vb1 and Vb2(VQ and VI) from the balanced receivers 3 and 4, which are suppressed of intensity noise, are multiplied together by a mixer 5 so as to cancel phase-modulated components by each other to obtain an output V3. The output V3 is applied to a control circuit 6 to obtain an output Vc therefrom. The output Vc is applied as a local light phase control signal to the laser light source 2 to perform feedback control to keep phase synchronization. The signal component of the output Vb2 (VI), which is modulated by the phase $\theta s$ of the signal light, is demodulated by a code judgment device 7 so that a demodulated signal SO is taken out. Since the local light intensity noises of the outputs Vb1 and Vb2 obtained from the balanced receivers 3 and 4 are suppressed enough by using the optical 90-degree hybrid unit 1 and the differential-synthesis-type balanced receivers in combination, phase detection good in signal-to-noise ratio is enabled.

In the optical 90-degree hybrid unit 1 shown in FIG. 5, the polarized components S2 and S3 of the separated signal light S1 are required to have the same phase as each other in the half mirrors 1b and 1d, and the polarized components L2 and L3 of the separated local light L1 are required to be kept at the phase difference of 90 degrees (which is made by the quarter-wavelength plate 1e) between themselves in the half mirrors. To meet these requirements equations (1-1) and (1-2) wherein lab, lad, lbc, lcd, λ, N1 and N2 denote the optical path length between the polarization beam splitter $1a$ and the half mirror $1b$, that between the splitter and the other half mirror $1d$, that between the other polarization beam splitter $1c$ and the former mirror, that between the latter splitter and the latter mirror, the wavelength of the light, and integers, respectively, need to exist as follows:

$$1ab = 1bc + \lambda \times N1 \quad (1\text{-}1)$$

$$1ad = 1cd + \lambda \times N2 \quad (1\text{-}2)$$

However, since errors are made in mounting the polarization beam splitters $1a$ and $1c$ and the half mirrors $1b$ and $1d$, the equations (1-1) and (1-2) should be replaced with others (2-1) and (2-2) below.

$$1ab = 1bc + \lambda \times N1 + \Delta 1 \quad (2\text{-}1)$$

$$1ad = 1cd + \lambda \times N2 + \Delta 2 \quad (2\text{-}2)$$

In these equations, $\Delta 1$ and $\Delta 2$ denote remainders in dividing the difference $1ab-1bc$ between the optical path lengths $1ab$ and $1bc$ by the wavelength $\lambda$, and that $1ab-1cd$ between the optical path lengths $1ad$ and $1cd$ by the wavelength, respectively. The remainders determine the relationship between the phases of the signal light and the local light in the optical 90-degree hybrid unit 1, and mean the errors which result in causing a residual phase difference $\delta\Omega$ between the signal light and the local light in synchronous detection as follows:

$$2\pi(\Delta 1 + \Delta 2)/\lambda = \delta\Omega \quad (3)$$

It depends on the existence or inexistence of the residual phase difference $\delta\Omega$ whether the polarized components L2 and L3 of the separated local light L1 have the phase difference of 90 degrees between themselves in the half mirrors $1b$ and $1d$. In order to make the quality of optical phase shift keying homodyne transmission good enough to keep the error ratio thereof not higher than $10^{-9}$, the residual phase difference between the signal light and the local light is required to be 0.173 rad or less throughout a phase synchronization system, as mentioned in J. Lightwave Technology, Vol. LT-5, No. 4, Pages 592 to 597, 1987. For that reason, the residual phase difference $\delta\Omega$ which occurs in the optical 90-degree hybrid unit 1 is required to be as follows:

$$\delta\Omega < 0.173 \text{ (rad)} \quad (4)$$

If the wavelength $\lambda$ in the equation (3) and the inequality (4) is 1.55 μm, the errors $\Delta 1$ and $\Delta 2$ in the mounting are required to be as follows:

$$\Delta 1 \times \Delta 2 < 0.021 \text{ (μm)} \quad (5)$$

Although it is not impossible to mount the polarization beam splitters $1a$ and $1c$ and the half mirrors $1b$ and $1c$ so as to establish the inequality (5), a highly accurate technique of processing is needed for the mounting and results in a problem of higher cost.

When the phase of the local light is synchronized with that of the signal light through control in the conventional optical phase detection method employing the optical 90-degree hybrid unit 1, the residual phase difference occurs due to the errors in the mounting of the members of the hybrid unit.

SUMMARY OF THE INVENTION

The present invention was made in order to solve the problem of the conventional optical phase detection method. Accordingly, it is an object of the invention to provide an optical phase detection method in which effects by a residual phase difference are avoided to accurately phase synchronization control to make the method have a low demodulation error.

The above-mentioned problem is solved by adopting the optical phase detection method which is provided in accordance with the present invention and in which a signal light polarized linearly and a local light emitted from a local light laser light source are combined with each other so that an in-phase component and a quadrature component, which is 90 degrees behind the local light in-phase and is combined with the signal light, are taken out; and the in-phase component is demodulated while the phase of the signal light and that of the local light are synchronized with each other through the use of the in-phase and the quadrature components. The method is characterized in that the signal light and the local light are separated into mutually-perpendicular P-polarized and S-polarized components by a first and a second polarization beam splitters; the phases of the P-polarized or S-polarized components are regulated by first and second optical phase compensation plates so that the polarized components of the signal light are kept at the same phase as each other, but the polarized components of the local light have a phase difference of 90 degrees between themselves; and the polarized components of the signal light and those of the local light are combined with each other by first and second combiners so that the in-phase component and the quadrature component are obtained.

In the optical phase detection method provided in accordance with the present invention, the first and the second optical phase compensation plates are disposed between the first polarization beam splitter and the second combiner and between the second polarization beam splitter and the first combiner, respectively, so as to compensate for the residual phase difference due to errors in the mounting of the first and the second polarization beam splitters and the first and the second combiners and regulate the phases of the in-phase and the quadrature components to keep a phase, difference of 90 degrees between them to make the method have a low demodulation error.

DETAILED DESCRIPTION OF EXEMPLARY EMBODIMENT

An embodiment of the present invention is hereafter described in detail with reference to the drawings attached hereto.

Figure 1:
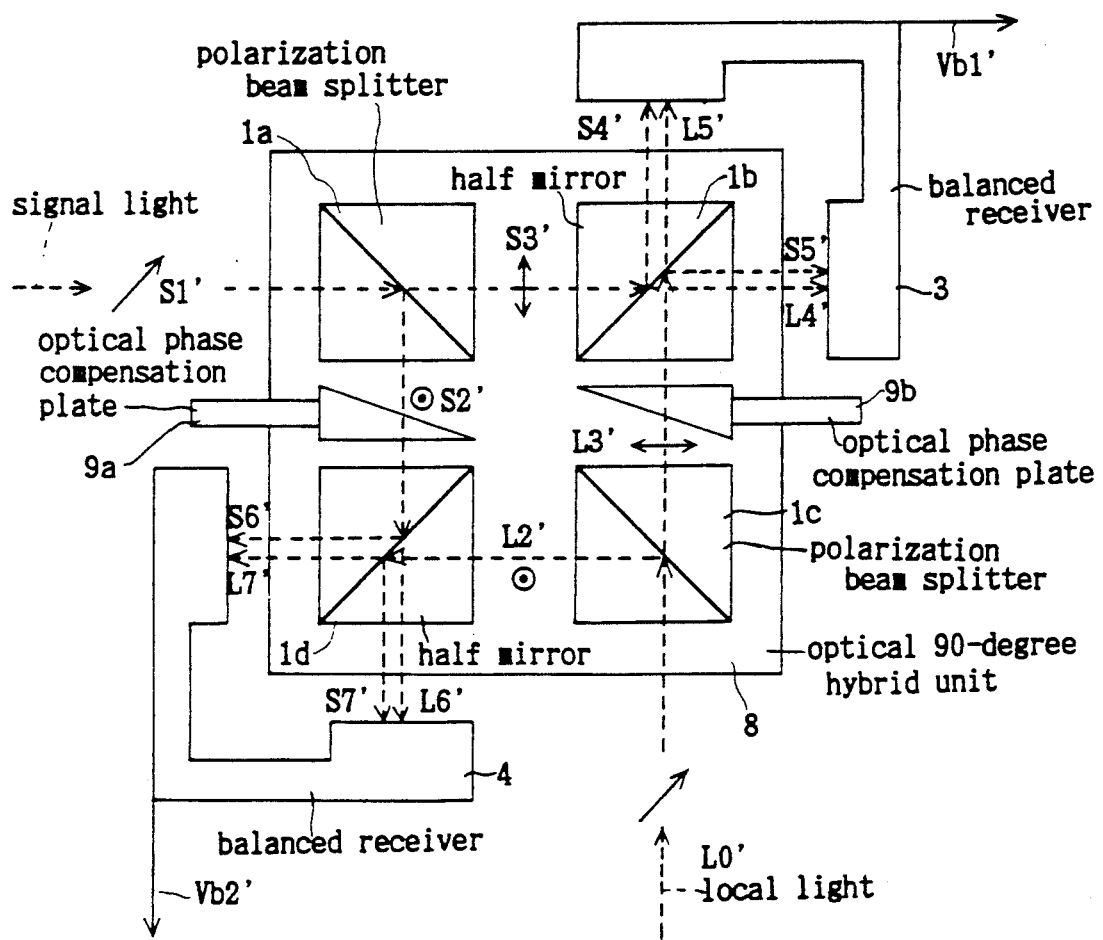
FIG. 1 is a structural view of an optical 90-degree hybrid unit for an optical phase detection method which is an embodiment of the present invention.

FIG. 1 shows an optical 90-degree hybrid unit 8 for an optical phase detection method according to an embodiment of the present invention. The same reference symbols in FIGS. 1 and 5 denote equivalents. A signal light S1' and a local light L0' are linearly polarized at angles of 45 degrees to polarization beam splitters 1a and 1c and then entered into them, respectively, so that the signal light is split into P-polarized and S-polarized components S3' and S2' by the splitter 1a, and the local light is split into P-polarized and S-polarized components L3' and L2' by the other splitter 1c. The phase of the S-polarized component S2' is regulated by an optical phase compensation plate 9a so that the same remainder Δ1 as that in the equation (2-1) is as follows:

$$\Delta 1 = 0 \quad (6)$$

The phase of the P-polarized component L3' is regulated by another optical phase compensation plate 9b so that the same remainder Δ2 as that in the equation (2-2) is as follows:

$$\Delta 2 = (\lambda/4) \times N3 \quad (7)$$

N3: Integer except zero

Since the equation (6) is thus established, the polarized components S2' and S3' of the signal light S1' have the same phase as each other in half mirrors 1b and 1d which are first and second combiners. Since the equation (7) is thus established, the difference between the phases of the polarized components L2' and L3' of the local light L0' on the half mirrors 1b and 1d is 90 degrees.

Figure 2:
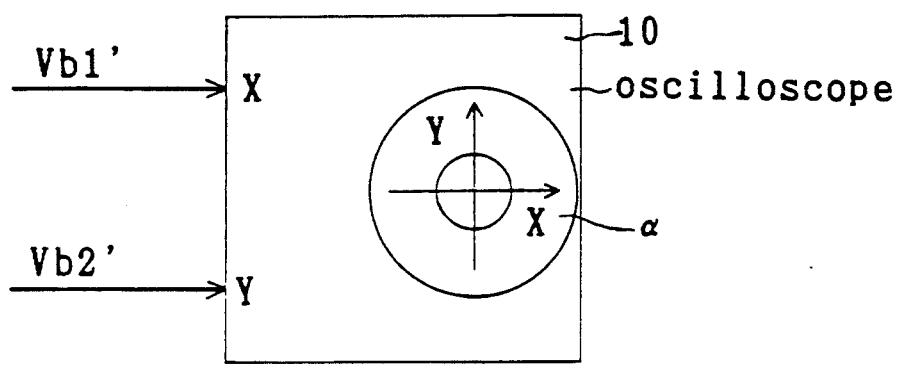
FIG. 2 is a view to illustrate a procedure of adjusting the unit.
Figure 4:
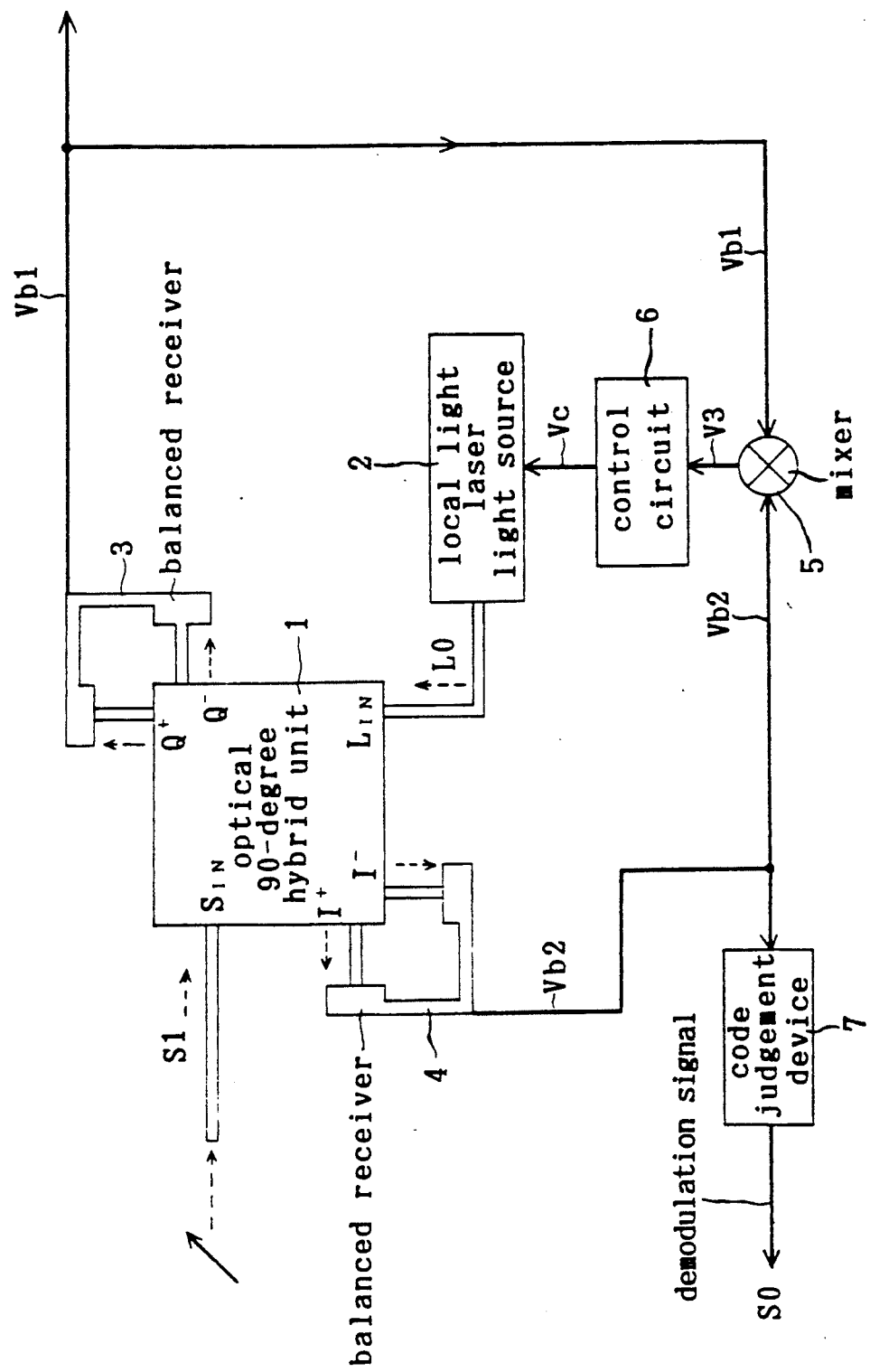
FIG. 4 is a structural view of a Costas-type optical phase locked loop.

The term λ/4 in the equation (7) means a phase difference of 90 degrees. A signal light S4', a local light L5', a signal light S5', a local light L4', a signal light S6', a local light L7', a signal light S7' and a local light L6', which are obtained by combining the P-polarized and S-polarized components S3', L3', S2' and L2' of the signal and the local lights S1' and L0' with each other through the use of the half mirrors 1b and 1d, are received by balanced receivers 3 and 4 so that outputs Vb1' and Vb2' are obtained therefrom. In order to adjust the optical phase compensation plates 9a and 9b so as to establish the equations (6) and (7), a Lissajous' figure α generated on an oscilloscope 10 by applying the receiver outputs Vb1' and Vb2' to the x-axis and y-axis terminals of the oscilloscope, as shown in FIG. 2, is observed. If the Lissajous' figure is a circle, it means that the equations (6) and (7) are established, and the light 90-degree hybrid unit 8 operates ideally, as mentioned in Applied Optics, Vol. 26, No. 3, Pages 437 to 439, Feb., 1987. For that reason, being affected by a residual phase difference due to an error in the mounting of the members of the hybrid unit 8 can be avoided to accurately control the phase of the local light L0' emitted from the local light laser light source 2 of a Costas-type light phase locked loop such as that shown in FIG. 4.

Figure 3:
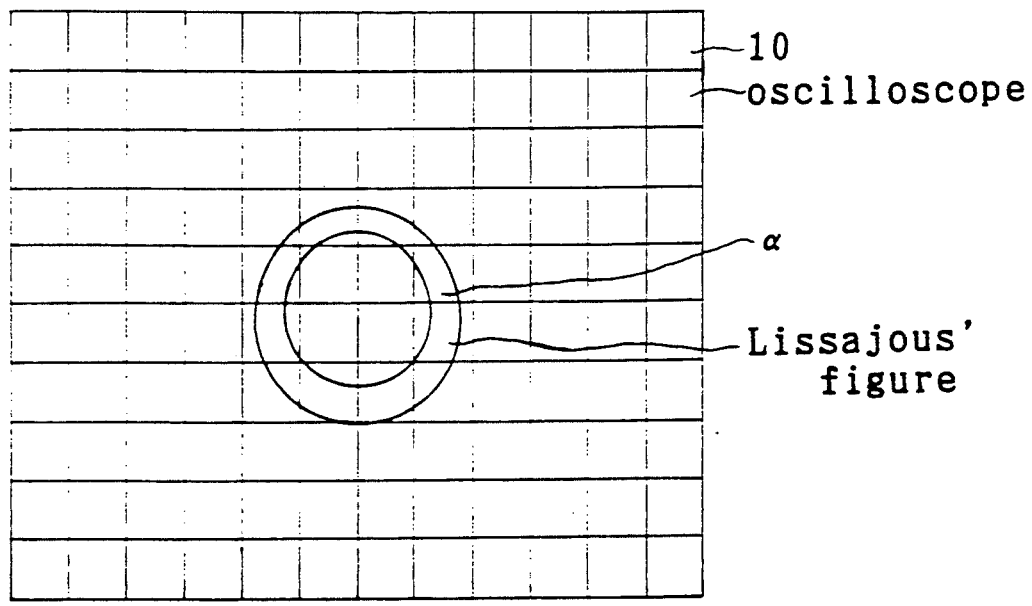
FIG. 3 shows a Lissajous' figure of in-phase and quadrature components to illustrate the ideal operation of the unit.

FIG. 3 shows a Lissajous' figure α of in-phase and quadrature components actually obtained through the optical 90-degree hybrid unit 8 in the optical phase detection method. Since the Lissajous' figure α is nearly a circle, the hybrid unit 8 is believed to operate well. In other words, the optical phase detection method having a low demodulation error can be much more easily provided because the hybrid unit 8 is employed.

Figure 5:
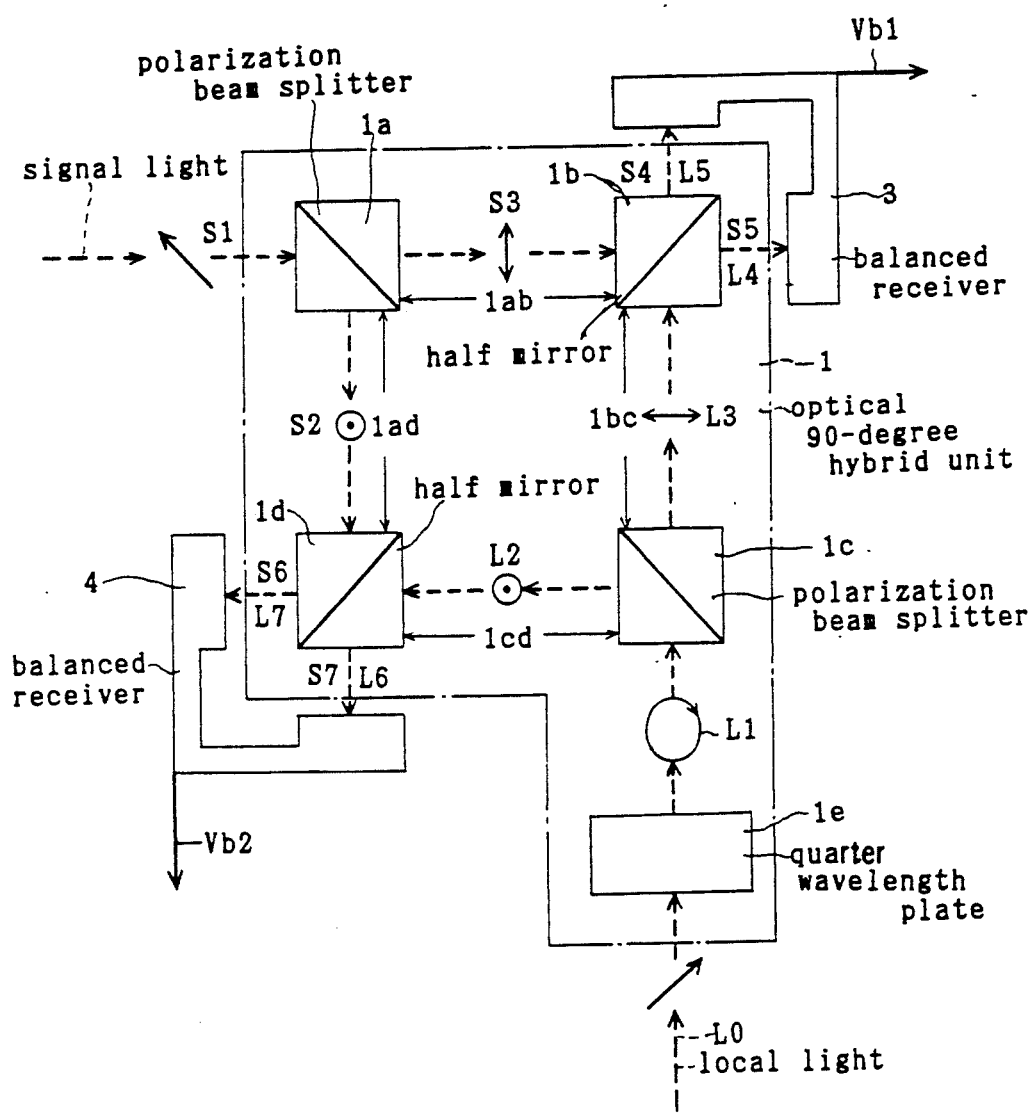
FIG. 5 is a structural view of an optical 90-degree hybrid unit.

According to the present invention, relations expressed by the equations (6) and (7) are established through phase regulation by the light phase compensation plates 9a and 9b. For that reason, a quarter-wavelength plate such as quarter-wavelength plate 1e shown in FIG. 5 is not needed, and the difficult operation of circularly polarizing the local light is dispensed with. Besides, being affected by the residual phase difference due to the error in the mounting of the members of the optical 90-degree hybrid unit is avoided to accurately control the phase of the local light. In other words, the residual phase difference is compensated for by the two optical phase compensation plates to regulate the phases of the signal light and the local light into an ideal relationship in the hybrid unit. The hybrid unit is made of only the optical members. Moreover, the excess insertion loss of the hybrid unit is 1 dB or less, and a local light intensity noise is suppressed by the balanced receivers.

Thus, the two optical phase compensation plates of the hybrid unit can be used to compensate for the residual phase difference due to the error in the mounting of the members of the unit and regulate the phases of the signal light and the local light into the ideal relationship. For that reason, the optical phase detection method having a low demodulation error can be more easily provided to be widely used for high-capacity coherent optical communication.

What is claimed is:

1. A method of optical phase detection, comprising the steps of:
   separating a linearly polarized signal light and a local light emitted from a local light laser light source into mutually-perpendicular P-polarized and S-polarized components by first and second polarization beam splitters;
   regulating the phases of at least one of said P-polarized and S-polarized components by first and second optical phase compensation plates so that the polarized components of said signal light are maintained in phase with each other, while the polarized components of said local light have a phase difference of 90° therebetween;
   combining the polarized components of said signal light and the polarized components of said local light with each other by first and second combiners to produce an in-phase component and a quadrature component 90° out phase with said in-phase component;
   demodulating said in-phase component to produce an output signal; and
   synchronizing the phases of said signal light and the phase of said local light with each other through the use of said in-phase component and said quadrature component.

2. A method according to claim 1, wherein said step of regulating includes the steps of:
   regulating the phase of the S-polarized component of said signal light by said first optical phase compensation plate; and
   regulating the phase of the P-polarized component of said local light by said second optical phase compensation plate.

3. A method according to claim 1, wherein said step of combining includes the steps of:

combining the P-polarized components of said signal light and said local light with each other to produce said quadrature component; and combining the S-polarized components of said signal light and said local light with each other to produce said in-phase component.

4. A method according to claim 1, wherein said step of synchronizing includes the steps of:

multiplying said quadrature component and said in-phase component with each other to produce an output in which phase-modulated components of said quadrature component and said in-phase component are cancelled by each other;

modifying said output by a control circuit; and controlling the phase of said local light with said modified output.

5. A method of optical phase detection, comprising the steps of:

separating a linearly polarized signal light and a local light emitted from a local light laser light source into mutually-perpendicular P-polarized and S-polarized components by first and second polarization beam splitters;

regulating the phases of at least one of said P-polarized and S-polarized components by first and second optical phase compensation plates so that the polarized components of said signal light are maintained in phase with each other, while the polarized components of said local light have a phase difference of 90° therebetween, said step of regulating including the steps of:

regulating the phase of the S-polarized component of said signal light by said first optical phase compensation plate, and regulating the phase of the P-polarized component of said local light by said second optical phase compensation plate;

combining the polarized components of said signal light and the polarized components of said local light with each other by first and second combiners to produce an in-phase component and a quadrature component 90° out of phase with said in-phase component, said step of combining including the steps of:

combining the P-polarized components of said signal light and said local light with each other to produce said quadrature component, and combining the S-polarized components of said signal light and said local light with each other to produce said in-phase component;

demodulating said in-phase component to produce an output signal; and synchronizing the phases of said signal light and the phase of said local light with each other through the use of said in-phase component and said quadrature component.

6. A method according to claim 5, wherein said step of synchronizing includes the steps of:

multiplying said quadrature component and said in-phase component with each other to produce an output in which phase-modulated components of said quadrature component and said in-phase component are cancelled by each other;

modifying said output by a control circuit; and controlling the phase of said local light with said modified output.

7. Apparatus for optical phase detection, comprising:

laser light source means for emitting a local laser light;

fist polarization beam splitter means for separating a linearly polarized signal light into mutually-perpendicular P-polarized and S-polarized components;

second polarization beam splitter means for separating said local light from said light source means into mutually-perpendicular P-polarized and S-polarized components;

combiner means for combining the polarized components of said signal light and the polarized components of said local light from said first and second polarization beam splitter means, with each other, to produce an in-phase component and a quadrature component 90° out of phase with said in-phase component;

optical phase compensation plate means, positioned between said first and second polarization beam splitter means and said combiner means, for regulating the phases of at least one of said P-polarized and S-polarized components, so that the polarized components of said signal light are maintained in phase with each other, while the polarized components of said local light have a phase difference of 90° therebetween;

demodulating means for demodulating said in-phase component to produce an output signal; and synchronizing means for synchronizing the phases of said signal light and the phase of said local light with each other through the use of said in-phase component and said quadrature component.

8. An apparatus according to claim 7, wherein said combiner means includes:

first combining means for combining the P-polarized components of said signal light and said local light with each other to produce said quadrature component; and second combining means for combining the S-polarized components of said signal light and said local light with each other to produce said in-phase component.

9. An apparatus according to claim 8, wherein said first combiner means includes a first half mirror and said second combiner means includes a second half mirror.

10. An apparatus according to claim 8, wherein said optical phase compensation plate means includes:

first optical phase compensation plate means, positioned between said first polarization beam splitter means and said second combining means, for regulating the phase of the S-polarized component of said signal light supplied by said first polarization beam splitter means to said second combining means; and second optical phase compensation plate means, positioned between said second polarization beam splitter means and said first combining means, for regulating the phase of the P-polarized component of said local light supplied by said second polarization beam splitter means to said first combining means.

11. An apparatus according to claim 7, wherein said synchronizing means includes:

mixer means for multiplying said quadrature component and said in-phase component with each other to produce an output in which phase-modulated components of said quadrature component and said in-phase component are cancelled by each other;

control circuit means for modifying said output from said mixer means and for controlling the phase of said local light with said modified output.

* * * * *